United States Patent
Moredock et al.

(10) Patent No.: US 8,529,324 B2
(45) Date of Patent: Sep. 10, 2013

(54) POWERED AIR CLEANING SYSTEM AND METHOD OF MAKING SAME

(75) Inventors: James G. Moredock, Jacksonville, FL (US); Eric L. Ehrenberg, Jacksonville, FL (US)

(73) Assignee: The Sy-Klone Company, Jacksonville, FL (US)

( * ) Notice: Subject to any disclaimer, the term of this patent is extended or adjusted under 35 U.S.C. 154(b) by 1601 days.

(21) Appl. No.: 10/553,167

(22) PCT Filed: Apr. 17, 2003

(86) PCT No.: PCT/US03/11788
§ 371 (c)(1),
(2), (4) Date: Jan. 4, 2007

(87) PCT Pub. No.: WO2004/098749
PCT Pub. Date: Nov. 18, 2004

(65) Prior Publication Data
US 2007/0173188 A1     Jul. 26, 2007

(51) Int. Cl.
*B01D 45/12* (2006.01)
(52) U.S. Cl.
USPC .......................................................... 454/155
(58) Field of Classification Search
USPC .......................................................... 454/155
See application file for complete search history.

(56) References Cited

U.S. PATENT DOCUMENTS

| | | | |
|---|---|---|---|
| 4,048,911 A * | 9/1977 | Petersen | 454/136 |
| 4,314,832 A | 2/1982 | Fox | |
| 4,350,509 A | 9/1982 | Alseth et al. | |
| 4,488,889 A | 12/1984 | McCarroll | |

(Continued)

FOREIGN PATENT DOCUMENTS

| JP | 46-051792 | 6/1971 |
|---|---|---|
| JP | 46-061846 | 7/1971 |

(Continued)

OTHER PUBLICATIONS

Supplementary Search Report in European Application No. EP 03 81 6901, May 14, 2007.

(Continued)

*Primary Examiner* — Steven B McAllister
*Assistant Examiner* — Samantha Miller
(74) *Attorney, Agent, or Firm* — Antonelli, Terry, Stout & Kraus, LLP.

(57) ABSTRACT

A powered air cleaning system (31) and a method of making the system are disclosed. The system comprises a flow path (22) extending through the system from an air inlet (4) to a clean air outlet (5). A motor-driven fan (24) located along the flow path draws particulate debris laden air into the inlet and rotates it about an axis (A-A) to form a rotating flow that stratifies the debris laden air with the heaviest particles in the outermost orbits of the rotating flow. An ejector port (8) is provided for ejecting particulate debris laden air from the stratified rotating flow in the system to the environment. An air filter (9) located within the rotating flow and across the flow path upstream of the outlet filters air from the innermost orbits of the stratified rotating flow. The system is formed of a plurality of components (2, 3) separately mountable in remote locations (32, 33) in a device to be supplied with clean air. The components are interconnected with an intermediate pipe assembly (34).

21 Claims, 8 Drawing Sheets

(56) References Cited

U.S. PATENT DOCUMENTS

| | | |
|---|---|---|
| 4,890,444 A | 1/1990 | Vander Giessen et al. |
| 5,112,372 A | 5/1992 | Boeckermann et al. |
| 5,211,846 A | 5/1993 | Kott et al. |
| 5,545,241 A * | 8/1996 | Vanderauwera et al. ....... 55/490 |
| 5,656,050 A | 8/1997 | Moredock |
| 5,766,315 A | 6/1998 | Moredock |
| 5,800,581 A | 9/1998 | Gielink et al. |
| D401,306 S | 11/1998 | Ward et al. |
| D407,475 S | 3/1999 | Coulonvaux et al. |
| 6,280,493 B1 | 8/2001 | Eubank |
| 6,319,304 B1 * | 11/2001 | Moredock ....................... 95/269 |
| 6,338,745 B1 | 1/2002 | Moredock et al. |
| 6,406,506 B1 | 6/2002 | Moredock et al. |
| 6,425,943 B1 | 7/2002 | Moredock |
| 6,451,080 B1 * | 9/2002 | Rocklitz et al. ................. 55/404 |
| D467,654 S | 12/2002 | Klug et al. |
| 6,569,219 B1 | 5/2003 | Connor et al. |
| D481,101 S | 10/2003 | Boehrs et al. |
| 6,878,189 B2 | 4/2005 | Moredock |
| 6,958,083 B1 | 10/2005 | Schmitz et al. |
| 7,004,987 B2 | 2/2006 | Pikesh et al. |
| 7,056,368 B2 | 6/2006 | Moredock et al. |
| 7,452,409 B2 | 11/2008 | Moredock et al. |
| 7,537,631 B2 | 5/2009 | Scott et al. |
| 7,662,203 B2 | 2/2010 | Scott et al. |
| D632,770 S | 2/2011 | Rotter et al. |
| 8,292,984 B2 | 10/2012 | Baseotto et al. |
| 8,394,166 B2 | 3/2013 | Scott et al. |
| 8,414,675 B2 | 4/2013 | Iddings et al. |
| 2012/0060453 A1 | 3/2012 | Holzmann et al. |

FOREIGN PATENT DOCUMENTS

| | | |
|---|---|---|
| JP | 48-91670 | 1/1973 |
| JP | 49-91670 | 9/1974 |
| JP | A-10-512492 | 12/1998 |
| JP | 2003-506204 | 2/2003 |
| JP | 2003-65030 | 3/2003 |
| WO | WO 96/22144 | 7/1996 |
| WO | WO 03/033107 A1 | 4/2003 |

OTHER PUBLICATIONS

Examination Report in European Application No. EP 03 81 6901, Oct. 4, 2007.
Japanese Office Action issued in Japanese Patent Application No. 138747/2008, dated May 24, 2011.
English Translation of Japanese Office Action issued in Japanese Patent Application No. 138747/2008, dated May 24, 2011.
Japanese Office Action; dated Jan. 29, 2008; Application No. 571641/2004; 9 pages.
International Search Report; PCT/US02/33220; Date of Mailing: Feb. 11, 2003.
International Search Report; PCT/US03/11788; Date of Mailing: Jul. 17, 2003.

* cited by examiner

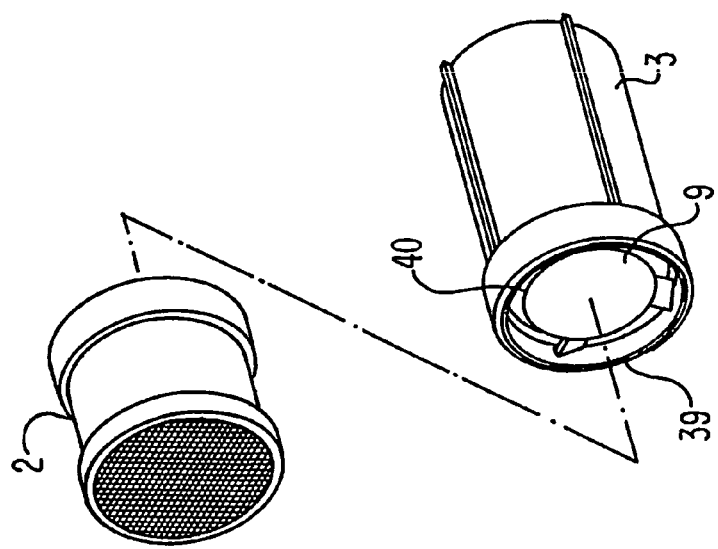
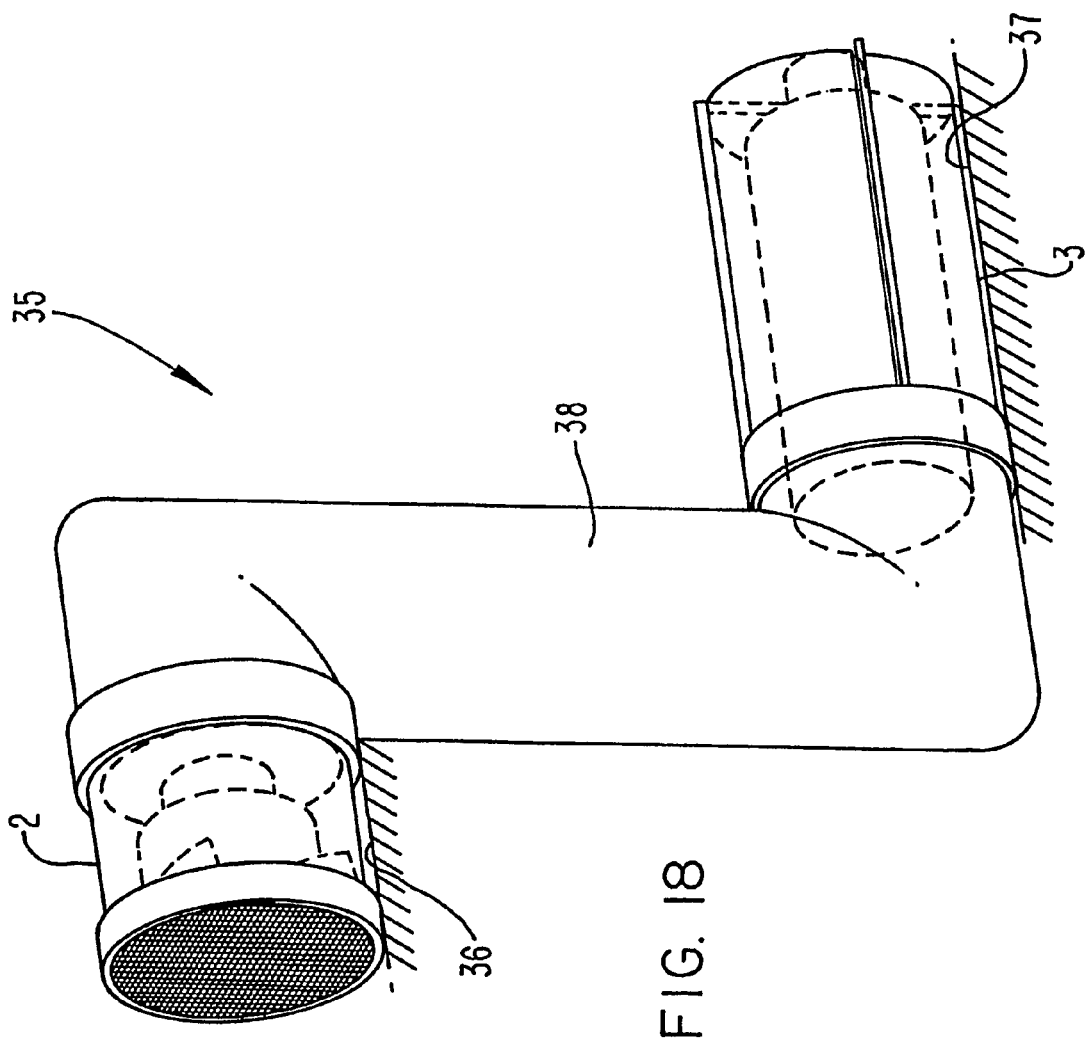

POWERED AIR CLEANING SYSTEM AND METHOD OF MAKING SAME

RELATED APPLICATION

This application is a U.S. national stage application under 35 U.S.C. §371 of international application PCT/US03/011788 filed Apr. 17, 2003, which is a continuation in part application of international application no. PCT/US02/33220 filed Oct. 18, 2002 which claims priority of U.S. provisional application No. 60/329,748 filed Oct. 18, 2001, the U.S. national stage application of PCT/US02/33220 issuing Jun. 6, 2006 as U.S. Pat. No. 7,056,368.

TECHNICAL FIELD

The present invention is directed to an improved powered, atmospheric ejective, air cleaning system and a method of making the same for efficiently removing debris from debris laden air to supply clean air to a device with which the system is used. For example, the invention is useful in connection with total air flow applications such as ventilation systems, as a fixed air flow provider for heat exchangers and heating and air conditioning systems, and with devices having a variable air flow demand, particularly internal combustion engines which exert a variable vacuum on their air intake to be supplied with clean air.

BACKGROUND AND SUMMARY

Air intakes that centrifugally separate heavier-than-air particles from the air to be used in internal combustion engines, ventilation systems, and other apparatus that draw in air laden with debris, are known. The use of in-line filters in air delivery systems to clean the air is also, per se, known. However, air filters are subject to plugging by debris from the air passing through the filter, which eventually increases the restriction to air flow through the filter and decreases the operating performance of an associated device, such as an electronically controlled internal combustion engine being supplied with air through the filter. Frequent filter replacement and shorter service intervals may also be required, which increases the cost of operation. There is a need for an improved air cleaning system and method of making the same which combine centrifugal separation and air filtration in a manner to efficiently remove debris from debris laden air while reducing or avoiding the aforementioned problems.

A powered air cleaning system according to the invention comprises a flow path extending through the system from an air inlet to a clean air outlet. A motor-driven fan is located along the flow path to draw particulate debris laden air into the inlet and rotate it about an axis to form a rotating flow that stratifies the debris laden air with the heaviest particles in the outermost orbits of the rotating flow. An ejector port is provided for ejecting particulate debris laden air from the stratified rotating flow in the system to the environment. An air filter is located within the rotating flow and across the flow path upstream of the clean air outlet for filtering air from the innermost orbits of the stratified rotating flow. According to the disclosed example embodiments of the invention, the filter is elongated in the direction of the axis about which the debris laden air is rotated. An outer peripheral surface of the filter within the rotating flow is swept by innermost orbits of the stratified rotating flow for minimizing debris buildup on the filter.

In the example embodiments the system comprises a plurality of separable components, each defining a portion of the flow path through the system, the components being detachably connected to each other in two embodiments or located remotely, where they are separately mounted, and interconnected by an intermediate pipe assembly in a third embodiment. This modular nature of the system, with separable fan housing and air filter housing components, affords flexibility in making the system in devices with limited spaces for the system components.

A method of making a powered air cleaning system of the invention comprises forming a powered air cleaning system as a plurality of components, each defining a respective portion of a flow path through the system from an inlet to an outlet, the components including first and second components, the first component having a motor-driven fan located along the flow path to draw particulate debris laden air into the inlet and rotate it about an axis to form a rotating flow that stratifies the debris laden air with the heaviest particles in the outermost orbits of the rotating flow, and the second component having a separator-ejector chamber in the flow path downstream of the motor-driven fan, an air filter located within the separator-ejector chamber and across the flow path upstream of the outlet for filtering air from the innermost orbits of the stratified rotating flow, and an ejector port for ejecting particulate debris laden air from the stratified rotating flow in the system. The method further comprises separately mounting the first and second components in remote locations in a device requiring a supply of clean air, such as a device having a variable air flow demand, e.g. an internal combustion engine, and interconnecting the flow path through the first and second components with an intermediate pipe assembly which forms a portion of the flow path of the system.

These and other features and advantages of the present invention will become more apparent from the following description when taken in connection with the accompanying drawings, which show, for purposes of illustration only, three example embodiments in accordance with the present invention.

BRIEF DESCRIPTION OF THE DRAWINGS

FIG. 18 is a perspective view from one side of a third example embodiment of the air cleaning system/apparatus of the invention wherein the air filter housing and the motor-driven fan housing are separately mounted remote from one another in a device to be supplied with air from the system, the two housings being connected by an intermediate pipe assembly of the system.

FIG. 19 is a schematic, perspective view of the system of FIG. 18 showing a compression assembly located in the filter housing upstream of the air filter to ensure stratification of the debris laden air at the filter housing, the axis of the flow path between the fan housing and the filter housing being shown in dashed lines without illustration of the intermediate pipe assembly.

BEST MODE FOR CARRYING OUT THE INVENTION

Figure 1:
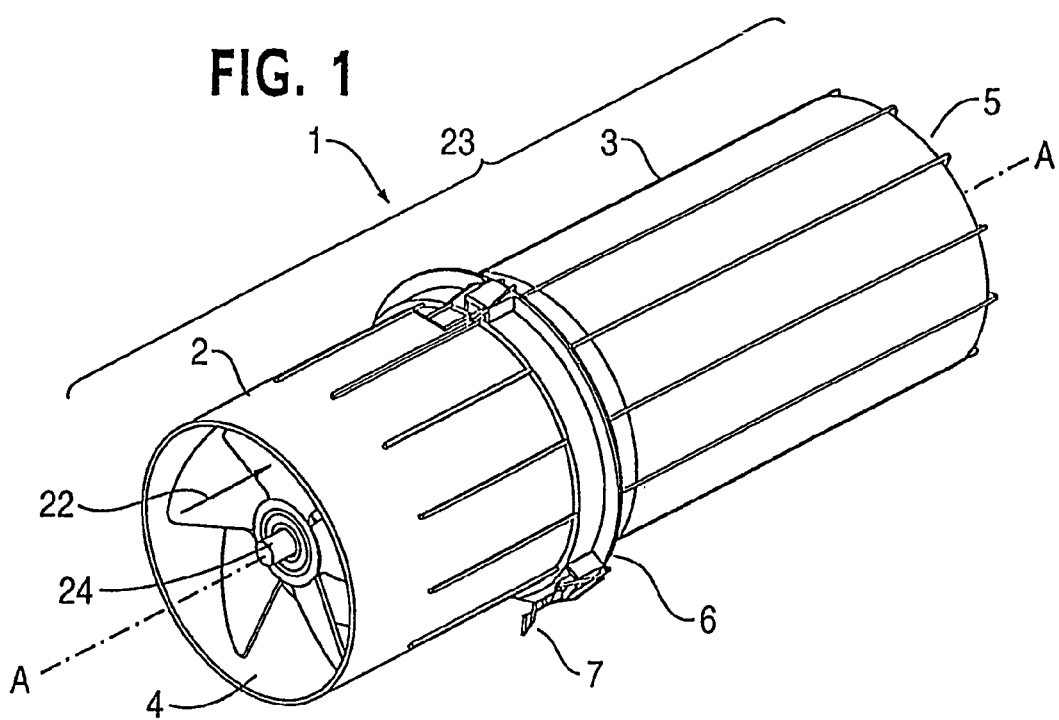
FIG. 1 is a perspective view from the front, inlet end, and to one side, of a powered air cleaning system/apparatus according to a first, example embodiment of the present invention.
Figure 2:
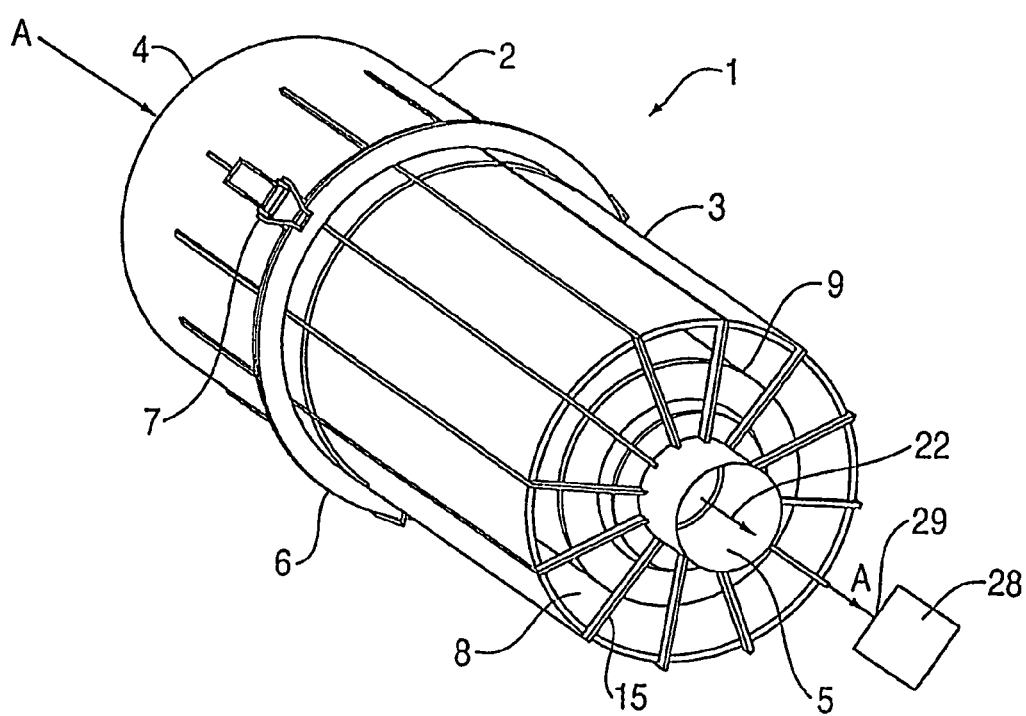
FIG. 2 is a perspective view from the back, outlet end, and to one side, of the air cleaning system of FIG. 1, shown, schematically, connected to an air intake of a device with a variable air flow demand.
Figure 3:
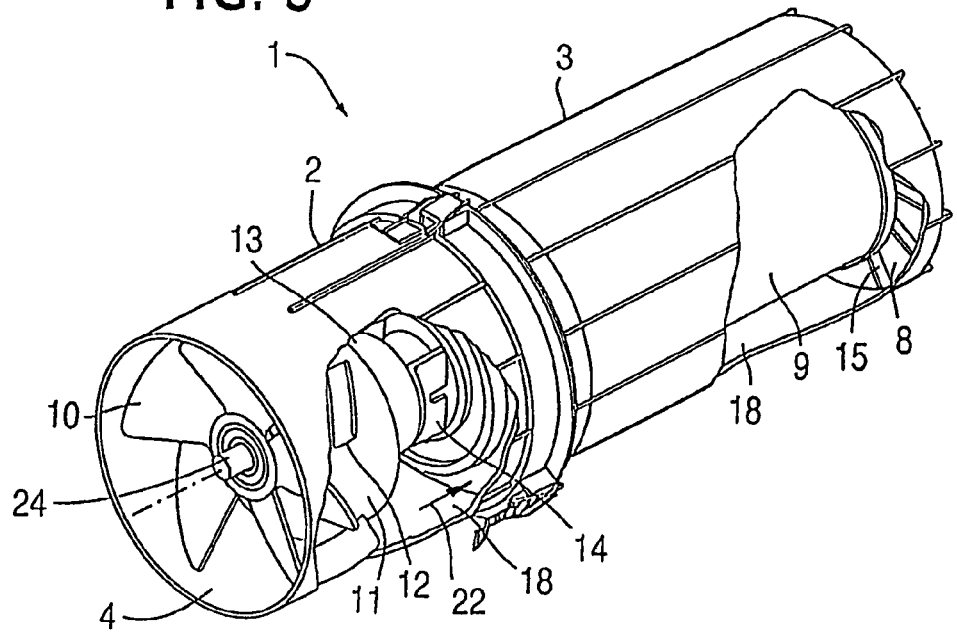
FIG. 3 is a view of the system similar to FIG. 1 with portions of the housing cut away to show components within the housing.
Figure 4:
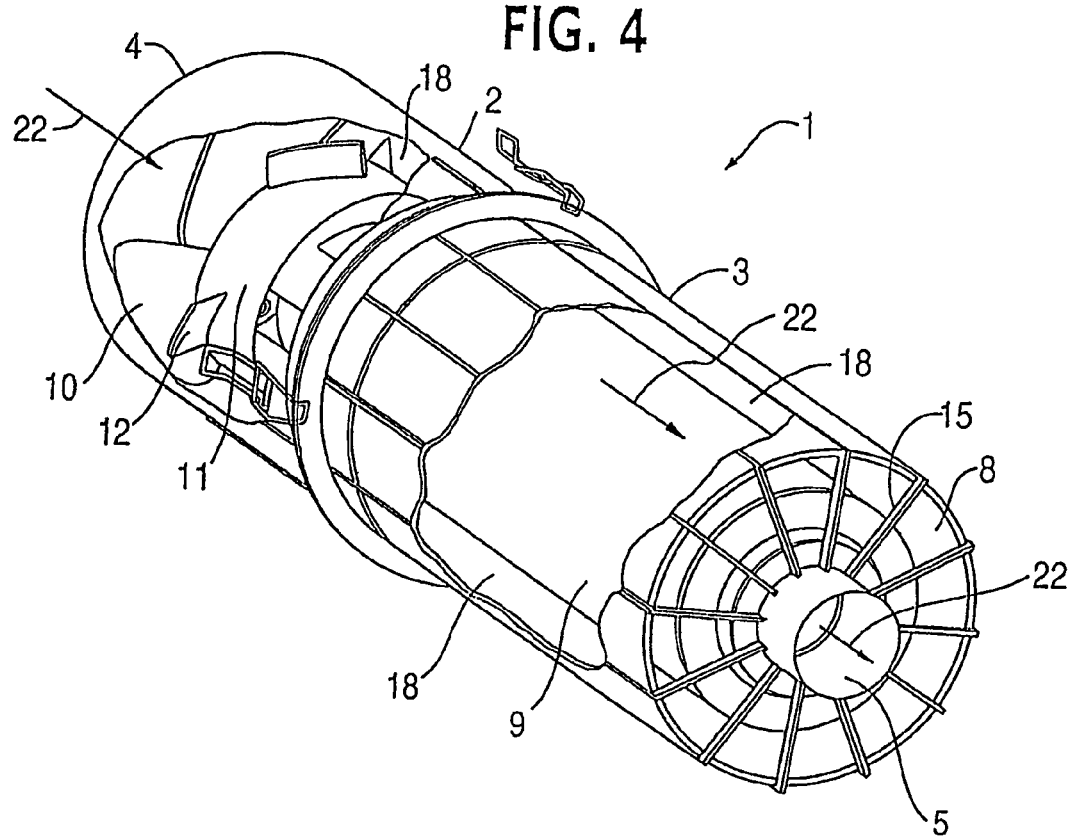
FIG. 4 is a view of the system similar to FIG. 2 with portions of the housing cut away to depict components inside the housing.
Figure 5:
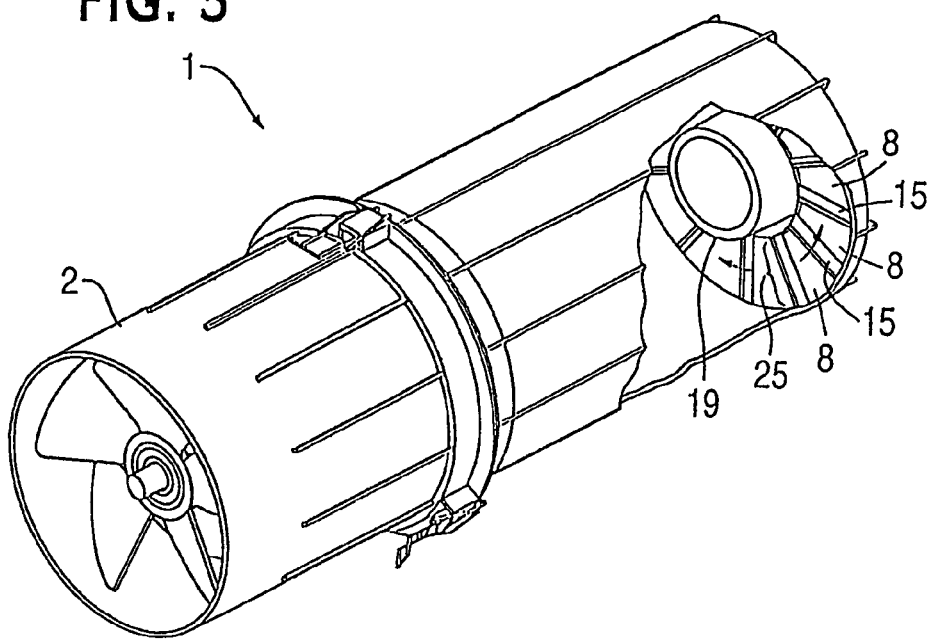
FIG. 5 is a view of the system like FIG. 1 except with a portion of the housing removed and with the filter in the system removed to show the clean air outlet orifice through the back, outlet end of the housing.
Figure 6:
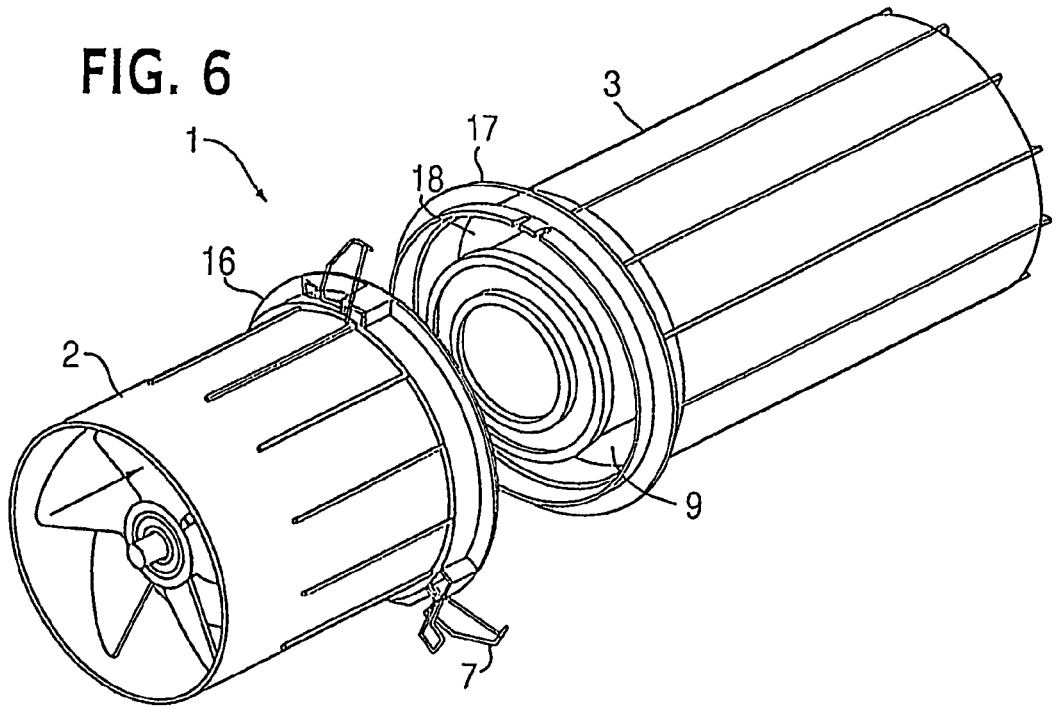
FIG. 6 is a perspective view of the system like FIG. 1 but with the detachable motorized fan housing and filter housing forming the system housing being separated from one another.
Figure 7:
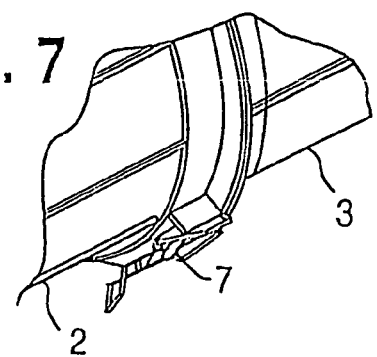
FIG. 7 is a detailed view of a portion of the joined detachable motorized fan housing and filter housing having a removable joining clip thereof as shown in FIG. 5.
Figure 8:
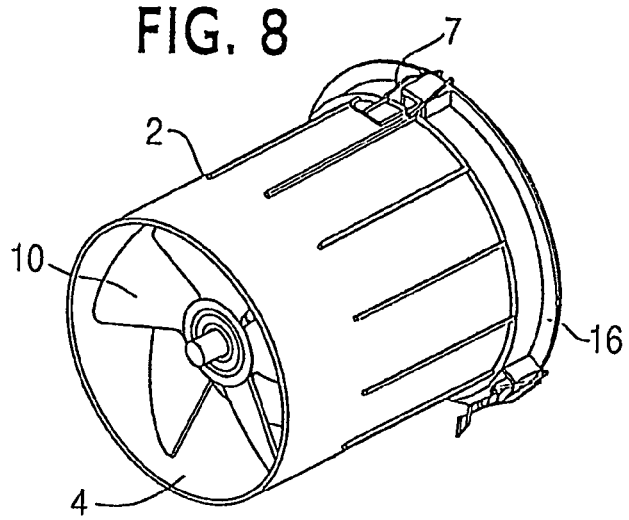
FIG. 8 is a perspective view from the front, inlet end, and to one side, of the detachable motorized fan housing of the system of FIG. 1.
Figure 9:
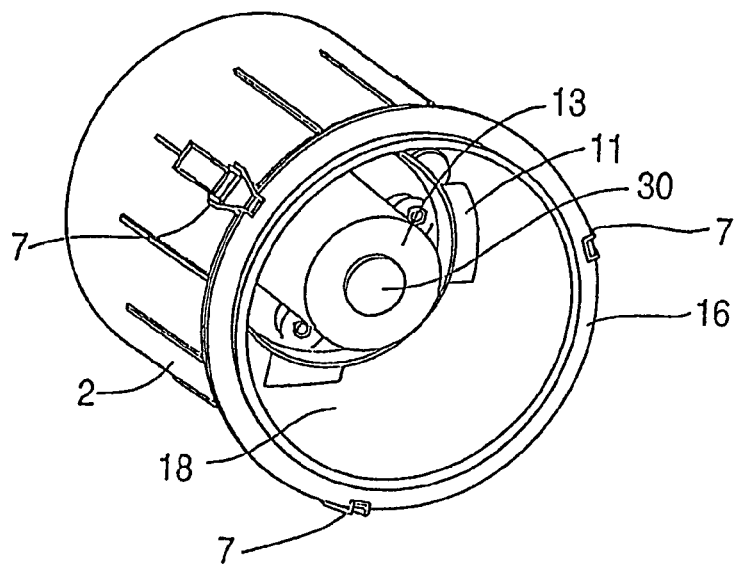
FIG. 9 is a perspective view from the back, outlet end of the detachable motorized fan housing system of FIG. 1.

Referring now to the drawings, a powered air cleaning system or apparatus 1, FIGS. 1-6, according to a first example embodiment is shown connected to the air intake 29 of a device 28, such as an internal combustion engine or other device requiring a supply of clean air, as shown schematically in FIG. 2. The system comprises a flow path 22 extending through the system from an air inlet 4 to a clean air outlet 5 which supplies clean air to the air intake 29 of device 28. The flow path is located within a generally cylindrical housing 23 of the system. Housing 23 is formed by two detachable components—motorized fan housing 2 and filter housing 3 which are detachably connected to one another at a service flange assembly 6 by joining clips 7, see FIG. 7. For this purpose each of the housings 2 and 3 has a joining flange, 16 and 17, respectively. The housings 2 and 3 are shown detached from one another in FIG. 6 and shown separately in FIGS. 8 and 9, and 12 and 13, respectively.

A motor-driven fan 24, comprising a fan blade 10 mounted on the output shaft of an electric motor 13, is located along the flow path 22 to draw particulate debris laden air into the inlet 4 and rotate it about an axis A-A to form a rotating flow in the system that stratifies the debris laden air with the heaviest particles in the outermost orbits of the rotating flow. A compression assembly 11 in the form of an angled louver/motor mount assembly with fixed louvers or vanes 12 is located within the fan housing 2 downstream of the fan blade 10. The compression assembly compresses the volume of the rotating flow of debris laden air drawn into the system inlet to increase the air velocity and centrifugal force acting on the airborne articles. The motor-driven fan 24 is supported at motor 13 thereof within the fan housing by way of the angle louver/motor mount assembly 11 as seen in FIGS. 3, 4, 8 and 9.

A separator-ejector chamber 18 is provided in the flow path of the air cleaning system downstream of the angled louver/motor mount assembly, FIGS. 3-6, 9 and 15. The outermost orbits of the rotating flow pattern of debris laden air ride on the outer wall 27 of the separator-ejector chamber until reaching an annular ejector port 25 formed about the outlet 5 in the outlet end of the housing radially outward of the clean air outlet. The ejector port is formed by a series of circumferential radial ejection slots 8 separated by strakes 15. The ejector port ejects particulate debris laden air from the stratified rotating flow in the system to the environment.

Figure 10:
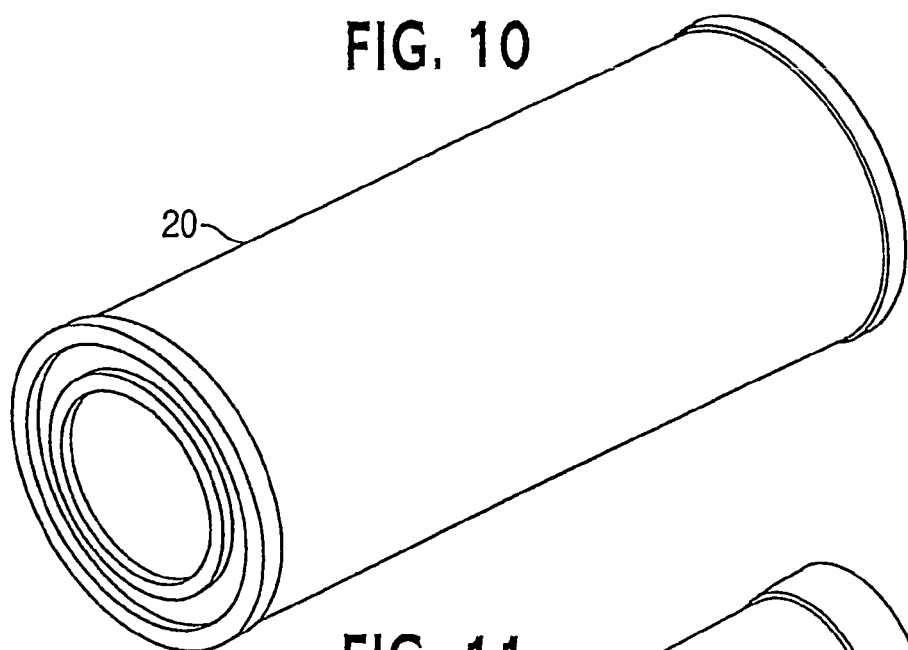
FIG. 10 is a perspective view of a main primary air filer element used in the system of FIG. 1.
Figure 11:
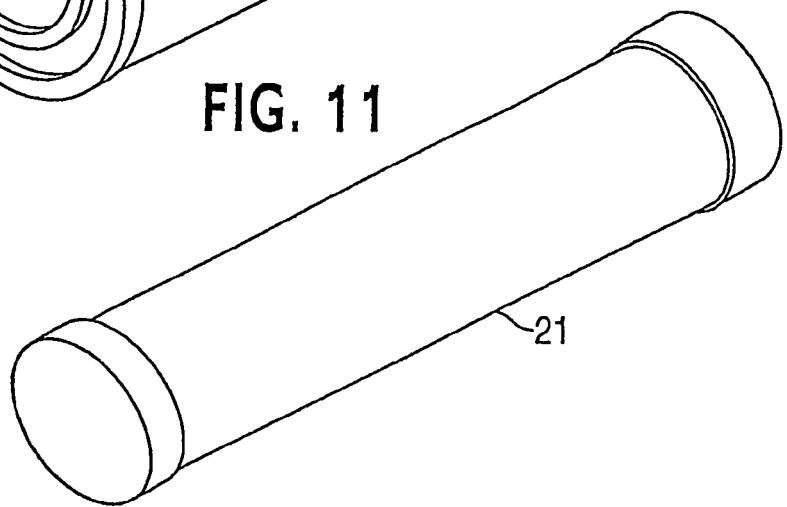
FIG. 11 is a perspective view of a secondary safety air filter element optionally used in the system of FIG. 1 inside of the main primary air filter element.
Figure 12:
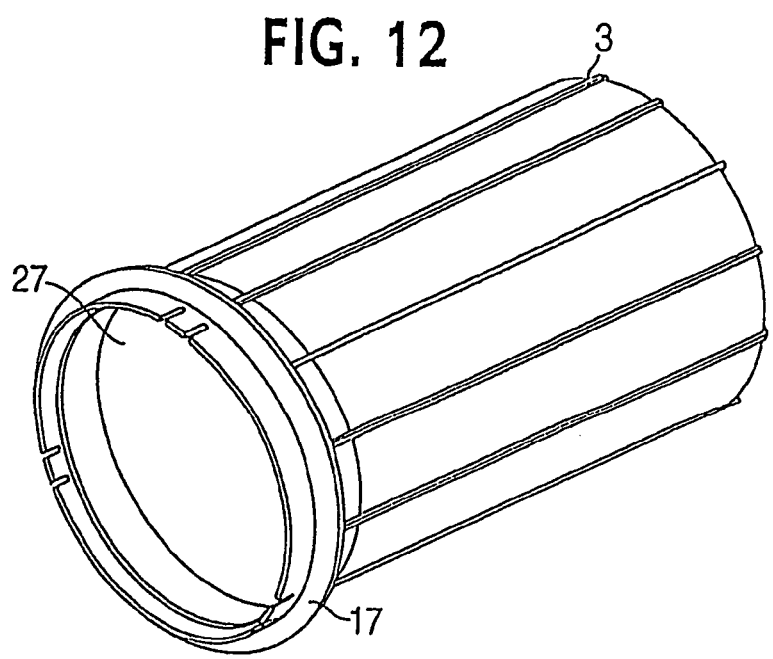
FIG. 12 is a perspective view of the filter housing from the front end with no filter installed therein.
Figure 13:
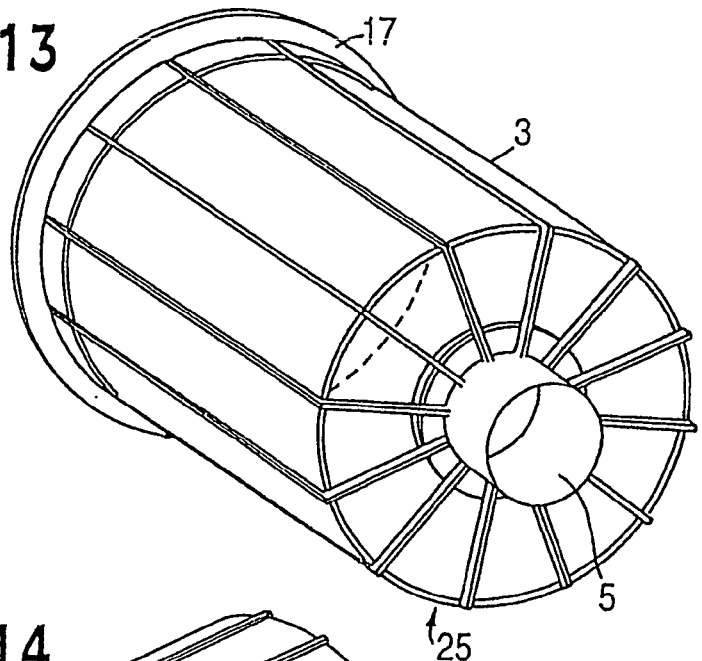
FIG. 13 is a perspective view of the filter housing from the back, outlet end thereof with no filter installed.
Figure 14:
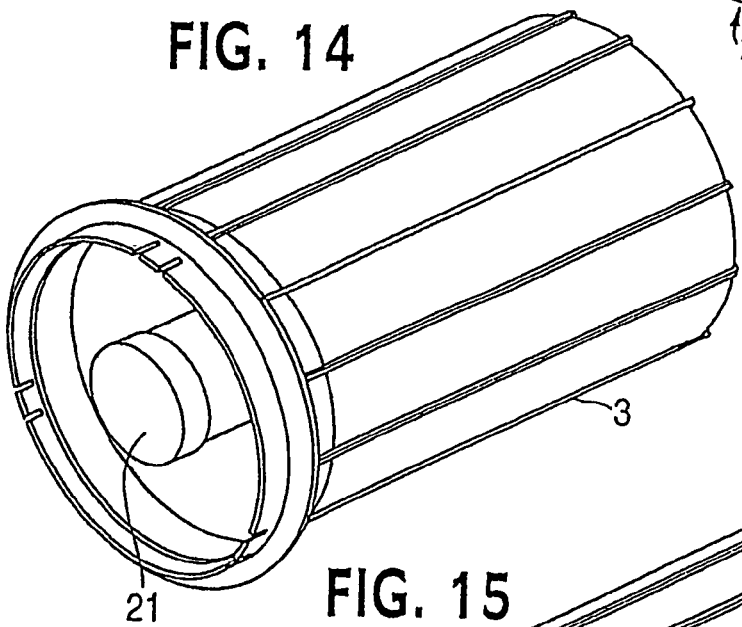
FIG. 14 is a perspective view of the filter housing like FIG. 12 but with the optional safety filter installed.
Figure 15:
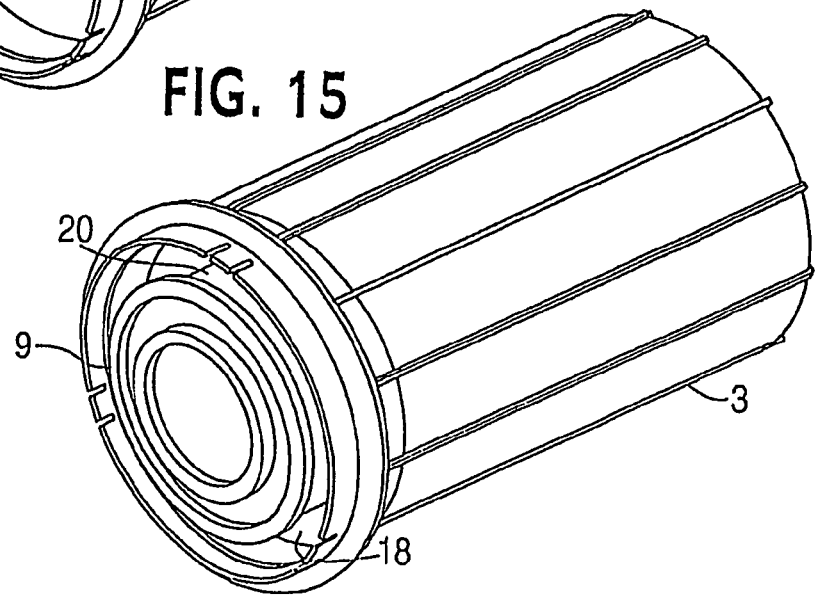
FIG. 15 is a perspective view of the filter housing like FIG. 13 but with the main filter shown installed therein.

An air filter 9, FIGS. 2-4, 6 and 15, in the form of a filter package of at least a main primary air filter element 20, FIGS. 10 and 15, and optionally a secondary safety air filter element 21, FIGS. 11 and 14, located within the filter element 20, is located within the rotating flow and across the flow path upstream of the outlet for filtering air from the innermost orbits of the stratified rotating flow in the system as the air flows to the clean air outlet 5. The filter 9 is elongated in the direction of and extends along the central longitudinal axis A-A of the generally cylindrical housing 23 in the separator-ejector chamber from the outlet end, where it is mounted on clean air outlet orifice 19, FIG. 5. The upstream end of the filter 9 is supported by a filter compression bracket 14 connected to a support flange 30, FIG. 9, on the end of motor 13.

Debris buildup on the outer surface of the filter 9 is minimized by locating the filter within the rotating flow of the debris laden air in the separator-ejector chamber 18 and by returning particulate debris laden air from the stratified rotating flow in chamber 18 unrestricted through the ejector port 25 at the end of the chamber, e.g., without disrupting the stratified rotating flow in the chamber. The self cleaning action on the filter 9 has also been found to be enhanced, in supplying air to the air intake 29 of a device 28 having a cyclic air flow demand, such as an internal combustion engine which applies a variable vacuum to the outlet 5 of the system, by operating the motor-driven fan to maintain positive air flow pressure on the outer surface of the filter and to return debris laden air to the environment from the system at all rates of air flow demanded by the device. The air cleaning system 1 is designed to generate a much larger air flow than the engine or apparatus 28 upon which it is installed requires, thereby providing a consistent positive air flow pressure to the filter keeping debris buildup on the air filter to a minimum and providing a powerful air flow out of the 360° ejection port 25 formed by the series of radial ejection slots 8 located at the end of the separator-ejector chamber.

The air cleaning system and method of making the same of the invention make it possible to maintain low air filter restriction throughout normal service intervals for internal combustion engines and other apparatus by significantly extending air filter life over current service intervals. While the air cleaning system and method of making the same have been described specifically for use in supplying clean air to an internal combustion engine, the invention is not limited to such a use but has wide application for a variety of devices requiring a supply of clean air including ventilation systems, heat exchangers, air compressors, and heating and air conditioning systems.

Figure 16:
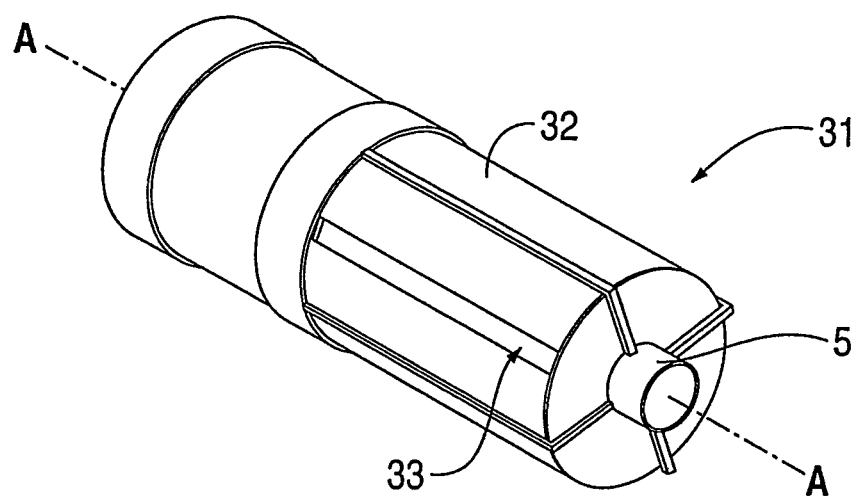
FIG. 16 is a perspective view from the back, outlet end, and to one side, of a second example embodiment of the air cleaning system/apparatus of the invention wherein the filter housing has a solid rear panel about the clean air outlet and an outer cylindrical wall, with a long ejection slot the length of the air filter.

A second example embodiment of the powered air cleaning system or apparatus 31 of the invention shown in FIG. 16 is like the system or apparatus 1 of the first example embodiment except for the filter housing, 32 in FIG. 16. That is, instead of providing the ejector port in the outlet end of the filter housing radially outward of the clean air outlet as in the first example embodiment, in the filter housing 32 the ejector port 33 is located radially outward of the outermost orbits of the rotating flow opposite the air filter. In particular, the ejector port 33 is in the form of a slot in the outer wall of the separator-ejector chamber of the filter housing, the slot extending the length of the air filter. The outlet end of the housing 32 has a solid panel, e.g. is closed, about the clean air outlet 5.

Thus, instead of the debris being allowed to stay in its stratified state for the length of the housing until it is ejected at the rear of the system or apparatus as in the first example embodiment, in the system or apparatus 31 with filter housing 32, as the debris hits the outer orbits of the separation pattern, it is immediately ejected from the rotating flow and the system or apparatus through the ejector slot 33. This feature facilities directing the debris away from the system or apparatus and channeling the debris away from the device, such as an internal combustion engine, on which the system or apparatus is installed. The air filter within the filter housing 32 can also advantageously be subjected to the slight positive pressure during use, reducing restriction to the engine or other device on which the system or apparatus is installed.

Figure 17:
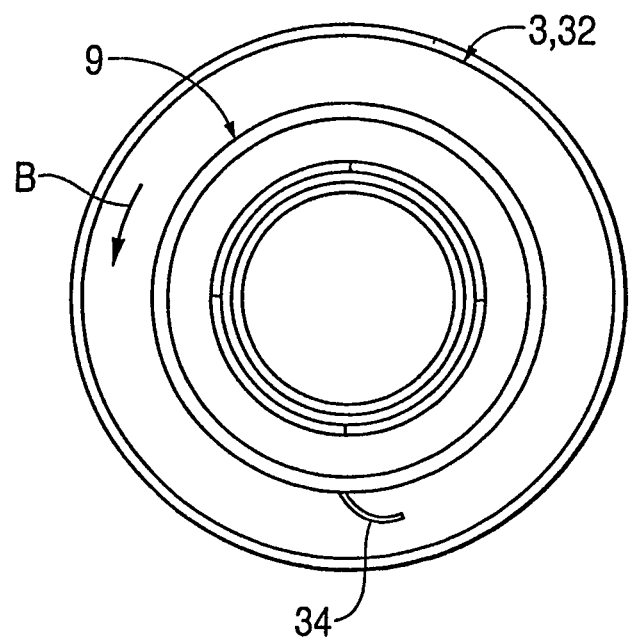
FIG. 17 is a schematic, cross-sectional view taken at a right angle to the axis A-A of any of the disclosed embodiments, showing the provision of a debris strake connected to the air filter and extending the length of the filter to help channel the debris in the rotating flow of debris laden air away from the filter to the outer wall of the filter housing.

Another feature of the invention shown in FIG. 17 can be used with each of the example embodiments. This involves the provision of a debris strake 34 on the outer periphery of the air filter 9. The strake 34 extends longitudinally the length of the air filter and extends outwardly from the outer periphery of the filter in a direction of the rotating flow, shown by arrow B in FIG. 17, for channeling debris in the rotating flow adjacent the air filter away from the filter to the outermost orbits of the rotating flow for ejection from the system.

A third example embodiment of the powered air cleaning system or apparatus 35 of the invention shown in FIG. 18 is like the system or apparatus 1 of the first example embodiment or the system or apparatus 31 of the second example embodiment except that the detachable components, motorized fan housing 2 and filter housing 3/32 (identified only as 3 in FIGS. 18 and 19) are separately mounted at remote locations 36 and 37, respectively, of the device requiring a supply of clean air. An additional pipe assembly 38 is used to connected the separated housings. The housings 2 and 3/32 are each detachable from respective ends of the pipe assembly to facilitate installation, assembly and disassembly for repair or replacement of the system and its component parts.

An optional feature of the system 35 shown in FIG. 19 is the provision of a remote compression assembly in the form of a louvered collar 39 having a plurality of stationary vanes 40 in the flow path to direct the debris-laden air into proper rotating flow. That is, the compression assembly compresses the volume of the rotating flow of debris laden air to increase the air velocity and centrifugal force acting on the airborne particles. In the example embodiment, louvered collar 39 is located in the filter housing 3/32 upstream of the air filter 9 and supports the upstream end of the air filter in lieu of the filter compression bracket, 14 in the first embodiment. The same or an additional louvered collar 39 with vanes 40 can also be attached to the back or downstream side of the fan housing 2 to ensure proper rotating flow in the system 35. Because of the plurality of separable components, each of which is separately mountable to the device, the system is modular, permitting flexibility in adapting the system to complex devices requiring a supply of clean air.

While we have shown and described only three embodiments in accordance with the present invention, it is understood that the same is not limited thereto, but is susceptible to numerous changes and modifications as known to the skilled in the art. For example, the powered air cleaning systems of the invention can be used without the air filter 9 to supply air to a device where centrifugal separation of debris from debris laden air and withdrawal of air from the innermost orbits of the rotating flow in the system by a vacuum from the device at the outlet of the system provides satisfactory cleaning. In this regard, it is noted that the positive pressure in the device maintains flow through the ejector port of the system while the pressure at the clean air outlet remains essentially neutral, with or without air filter 9. The device draws clean air from the clean air outlet in accordance with its demand, e.g., vacuum pull applied to the clean air outlet of the system. Therefore, we do not wish to be limited to the details shown and described herein, but instead to cover all such changes and modifications as are encompassed by the scope of the appended claims.

What is claimed is:

1. A powered air cleaning system comprising:
   a flow path extending through the system from an inlet to an outlet;
   a motor-driven fan located along the flow path to draw particulate debris laden air into the inlet and rotate it about an axis to form a rotating flow that stratifies the debris laden air with the heaviest particles in the outermost orbits of the rotating flow;
   an ejector port for ejecting particulate debris laden air under positive pressure from the stratified rotating flow in the system;
   an air filter located within the rotating flow and across the flow path upstream of the ejector port and the outlet for filtering air from the innermost orbits of the stratified rotating flow, the air filter being elongated in the direction of said axis, the motor-driven fan operating to maintain a positive air flow pressure on the outer surface of the filter so that the rotating flow about the filter causes a self cleaning action on the filter;
   wherein the system includes at least two components defining a portion of the flow path through the system, the at least two components being a detachable fan housing containing the motor-driven fan and a detachable filter housing containing the air filter which the at least two components are separable from the system.

2. The air cleaning system according to claim 1, wherein the fan housing and the filter housing are detachably connected to each other.

3. The air cleaning system according to claim 1, further comprising an intermediate pipe assembly forming a portion of the flow path, the fan housing and the filter housing being detachably connected to respective ends of the intermediate pipe assembly.

4. The air cleaning system according to claim 3, further comprising a compression assembly located in the filter housing upstream of the air filter for compressing the volume of the rotating flow of debris laden air to increase the air velocity and centrifugal force acting on the airborne particles.

5. The air cleaning system according to claim 4, wherein the compression assembly provides support for an upstream end of the air filter.

6. The air cleaning system according to claim 4, wherein the compression assembly includes a plurality of stationary vanes in the flow path.

7. The air cleaning system according to claim 3, further comprising a compression assembly located in the fan housing for compressing the volume of the rotating flow of debris laden air to increase the air velocity and centrifugal force acting on the airborne particles.

8. The air cleaning system according to claim 7, wherein the compression assembly provides support for the motor-driven fan.

9. The air cleaning system according to claim 7, wherein the compression assembly includes a plurality of stationary vanes in the flow path.

10. The air cleaning system according to claim 1, further comprising a separator-ejector chamber in the flow path downstream of the motor-driven fan, the outermost orbits of the rotating flow riding on an outer wall of the separator-ejector chamber to the ejector port.

11. The air cleaning system according to claim 10, wherein the filter is located centrally within the separator-ejector chamber.

12. The air cleaning system according to claim 11, wherein the filter housing contains the separator-ejector chamber, air filter and the ejector port.

13. The air cleaning system according to claim 11, wherein an outer peripheral surface of the elongated filter is cylindrical.

14. A powered air cleaning system comprising:
a flow path extending through the system from an inlet to an outlet;
a motor-driven fan located along the flow path to draw particulate debris laden air into the inlet and rotate it about an axis to form a rotating flow that stratifies the debris laden air with the heaviest particles in the outermost orbits of the rotating flow;
an ejector port for ejecting particulate debris laden air under positive pressure from the stratified rotating flow in the system;
an air filter located within the rotating flow and across the flow path upstream of the ejector port and the outlet for filtering air from the innermost orbits of the stratified rotating flow, the air filter being elongated in the direction of said axis so that a positive air flow pressure of the rotating flow about the filter maintained by the motor-driven fan causes a self cleaning action on the filter; and
an intermediate pipe assembly forming a portion of the flow path between the motor-driven fan and the air filter so the fan and filter can be remote from one another.

15. The air cleaning system according to claim 14, further comprising a compression assembly located along the flow path between the intermediate pipe assembly and the air filter for compressing the volume of the rotating flow of debris laden air to increase the air velocity and centrifugal force acting on the airborne particles.

16. The air cleaning system according to claim 15, wherein the compression assembly provides support for an upstream end of the air filter in the flow path of the system.

17. The air cleaning system according to claim 15, wherein the compression assembly includes a plurality of stationary vanes in the flow path.

18. The air cleaning system according to claim 14, further comprising a fan housing containing the motor-driven fan, the fan housing being detachably connected to an upstream end of the pipe assembly.

19. The air cleaning system according to claim 14, further comprising a filter housing containing the air filter, the filter housing being detachably connected to a downstream end of the pipe assembly.

20. A method of making a powered air cleaning system comprising:
forming a powered air cleaning system as a plurality of components, each defining a respective portion of a flow path through the system from an inlet to an outlet, the components including first and second components, the first component having a motor-driven fan located along the flow path to draw particulate debris laden air into the inlet and rotate it about an axis to form a rotating flow that stratifies the debris laden air with the heaviest particles in the outermost orbits of the rotating flow, and the second component having a separator-ejector chamber in the flow path downstream of the motor-driven fan, the separator-ejector chamber having an ejector port for ejecting particulate debris laden air under positive pressure from the stratified rotating flow in the system, and an air filter located within the separator-ejector chamber and across the flow path upstream of the ejector port and the outlet for filtering air from the innermost orbits of the stratified rotating flow, the air filter being elongated in the direction of said axis so that a positive air flow pressure of the rotating flow about the filter maintained by the motor-driven fan causes a self cleaning action on the filter;
separately mounting the first and second components in remote locations in a device to be supplied with clean air; and
interconnecting the flow path through the first and second components with an intermediate pipe assembly which forms a portion of the flow path of the system.

21. The method according to claim 20, including providing a compression assembly in the second component upstream of the air filter for compressing the volume of the rotating flow of debris laden air to increase the air velocity and centrifugal force acting on the airborne particles.

* * * * *